United States Patent
Chandhok

(12) 
(10) Patent No.: US 6,787,083 B2
(45) Date of Patent: Sep. 7, 2004

(54) METHOD FOR PRODUCING THROUGH EXTRUSION AN ANISOTROPIC MAGNET WITH HIGH ENERGY PRODUCT

(75) Inventor: Vijay K. Chandhok, Pittsburgh, PA (US)

(73) Assignee: Advanced Materials Corporation, Pittsburgh, PA (US)

( * ) Notice: Subject to any disclaimer, the term of this patent is extended or adjusted under 35 U.S.C. 154(b) by 184 days.

(21) Appl. No.: 10/240,004

(22) PCT Filed: Mar. 9, 2001

(86) PCT No.: PCT/US01/07684
§ 371 (c)(1),
(2), (4) Date: Sep. 26, 2002

(87) PCT Pub. No.: WO01/84569
PCT Pub. Date: Nov. 8, 2001

(65) Prior Publication Data
US 2003/0052433 A1 Mar. 20, 2003

Related U.S. Application Data
(60) Provisional application No. 60/201,891, filed on May 4, 2000.

(51) Int. Cl.$^7$ ................................ H01F 7/06; B22F 7/00
(52) U.S. Cl. ........................... 264/112; 264/DIG. 58; 29/607; 29/608; 148/101
(58) Field of Search ...................... 264/112, DIG. 58; 148/101; 29/607, 608

(56) References Cited

U.S. PATENT DOCUMENTS 3,256,591 A 6/1966 Müller
4,915,891 A 4/1990 Chandhok et al.

*Primary Examiner*—Mary Lynn Theisen
(74) *Attorney, Agent, or Firm*—Webb Ziesenheim Logsdon Orkin & Hanson, P.C.

(57) ABSTRACT

A method for producing an anisotropic magnet with high energy product through extrusion and, more specifically, by placing a particle charge of a composition from the which magnet is to be produced in a noncircular container, heating the container and particle charge and extruding the container and particle charge through a noncircular extrusion die in such a manner that one of the cross-sectional axes or dimension of the container and particle charge is held substantially constant during the extrusion to compact the particle charge to substantially full density by mechanical deformation produced during the extrusion to achieve a magnet with anisotropic magnetic properties along the axes or dimension thereof and, more specifically, a high energy product along the transverse of the smallest cross-sectional dimension of the extruded magnet.

5 Claims, No Drawings

METHOD FOR PRODUCING THROUGH EXTRUSION AN ANISOTROPIC MAGNET WITH HIGH ENERGY PRODUCT

This application claims benefit of No. 60/201,891 filed May 4, 2000.

STATEMENT REGARDING FEDERALLY SPONSORED RESEARCH OR DEVELOPMENT

This invention was made with government support under a small business research and development grant for "A Simple Process to Manufacture Grain Aligned Permanent Magnets" awarded by the U.S. Department of Energy (Grant No. DE-FG02-97-ER82313). The Government has certain rights to this invention.

FIELD OF THE INVENTION

This invention relates to a method for producing, through extrusion, an anisotropic magnet with high energy product.

BACKGROUND OF THE INVENTION

It is known to produce an anisotropic permanent magnet through an extrusion process whereby a body charge of composition from which the magnet is to be produced is placed in a container, heated and extruded within the container to compact the body charge to substantially full density. U.S. Pat. No. 4,915,891 (Chandhok et al.) describes such a method.

In practice, however, this method has suffered from disadvantages which have precluded use of the resulting permanent magnets for commercial purposes. More specifically, while the prior art is intended to produce a permanent magnet having anisotropic magnetic properties along the axis thereof, in practice the prior art process produces permanent magnets with magnetization vectors that are random in the plane perpendicular to the extrusion direction and, therefore, the prior art is not able to produce a true anisotropic magnet (i.e., magnets with asymmetric magnetic properties along the axis thereof), through extrusion, with high energy product.

As described in Chandhok et al., it is known to produce a permanent magnet with anisotropic properties through an extrusion process. In particular, it is known to employ a rectangular extrusion die in connection with an extrusion process whereby a body charge of a composition from which the magnet is to be produced is placed in a cylindrical container, the container and body charge are heated and the container and body charge are extruded on a non-uniform basis to a substantially full density. In particular, an extrusion ratio within the range of 1.5:1 to 50:1 is used, together with extrusion temperatures within the range of 500° to 1500° C. Such non-uniform extrusion, as described in the prior art, occurs across all dimensions of the container and body charge.

By way of specific example, Chandhok et al. describes a 3⅛ inch diameter mild steel can which, after insertion of the body charge, is extruded to a rectangular shape with dimensions of 1.66 inches (w)×0.55 inches (T) at an average extrusion ratio of 8.4 to 1. While such an extrusion process produces asymmetric magnetic properties which vary at the transverses measured along the two dimensions, random magnetization vectors also exist. As a result of such random magnetization vectors, the resulting magnet does not have a high energy product.

SUMMARY OF THE INVENTION

It is the purpose of the present invention, therefore, to provide an improved method for producing permanent magnets with anisotropic properties through an extrusion process.

In particular, it is the object of this invention to provide a method for producing an anisotropic magnet body with high energy product through an extrusion process wherein optimum die shapes, extrusion ratios and extrusion temperatures are used. In particular, in the preferred embodiment of this invention, the container and the charge are extruded to a noncircular cross-sectioned shape, such as a rectangle, with one dimension being held substantially constant during extrusion.

DETAILED DESCRIPTION OF THE PREFERRED EMBODIMENTS

In accordance with the preferred embodiment of the invention, a permanent magnet with high energy product and having asymmetric or anisotropic magnetic properties along the axes thereof is produced by placing a body charge of a composition from which the magnet is to be produced in a container. The container and body charge are heated and extruded to compact the body charge to substantially full density by mechanical deformation produced during the extruding operation.

In a preferred embodiment of the invention, the die opening involved in the extrusion process is noncircular and one of the cross-sectional axes of the container is held substantially constant with the larger dimension of the dye opening. Holding one of the cross-sectional axes or dimension of the container substantially constant during extrusion results, in the present invention, in the creation of high energy product along the smallest cross-sectional axis or dimension of the extruded article.

By way of example, the present invention may be employed in connection with a cylindrical container having a 3 inch diameter. During the extrusion process, one of the cross-sectional axes of the container is held substantially constant. More specifically, a rectangular die with dimensions of 2.7 inches by 0.3 inches may be used, which results in an extruded, fully dense magnetic body having a high energy product along the 0.3 inch cross-sectional dimension of the body.

Similar results can be obtained using spherical, toroidal, arc-shaped and other noncircular die openings to yield a magnetic article with the desired properties. Again, in connection with these other die shapes, it is important that one of the cross-sectional axes or dimension of the charge and container remain relatively constant from the beginning through the end of the extrusion process.

Extrusion ratios may be employed within the range of 7.5:1 to 30:1. Extrusion temperatures can range from 1400° F. to 1800° F.

The method of the invention finds particular application to the production of permanent magnets from body charges comprising at least one rare element. The alloy may also include a transition element, such as iron and cobalt, and in addition, boron and/or carbon. Other example of magnets produced through this invention include Nd(Fe,Co)(B,Ga), Pr(Fe,Co,Cu)(B,Ga), $Sm_2Fe_{17}N_x$ and MnBi.

What is claimed is:

1. A method for producing an anisotropic magnet with high energy product, said method comprising placing a particle charge of a composition from which said magnet is to be produced in a container, heating said container and particle charge, and extruding said container and particle charge, through a noncircular extrusion die, in such a manner that one of the cross-sectional dimensions of said container and particle charge is held substantially constant during said extruding to compact said particle charge to substantially full density by mechanical deformation produced during said extruding and produce a high energy product along the smallest cross-sectional dimension of the extruded magnet.

2. The method of claim 1 wherein said extruding is performed at an extrusion ratio within the range of 7.5:1 to 30:1.

3. The method of claim 1 wherein said extruding is performed at a temperature within the range of 1400° F. to 1800° F.

4. The method of claim 1 wherein the shape of said extrusion die is rectangular.

5. The method of claim 1 wherein the shape of said extrusion die is selected from the group consisting of a sphere, toroid or arc.

* * * * *